Sept. 7, 1926.
J. KLEIN
1,599,177
SPRING SUSPENSION
Filed May 12, 1926
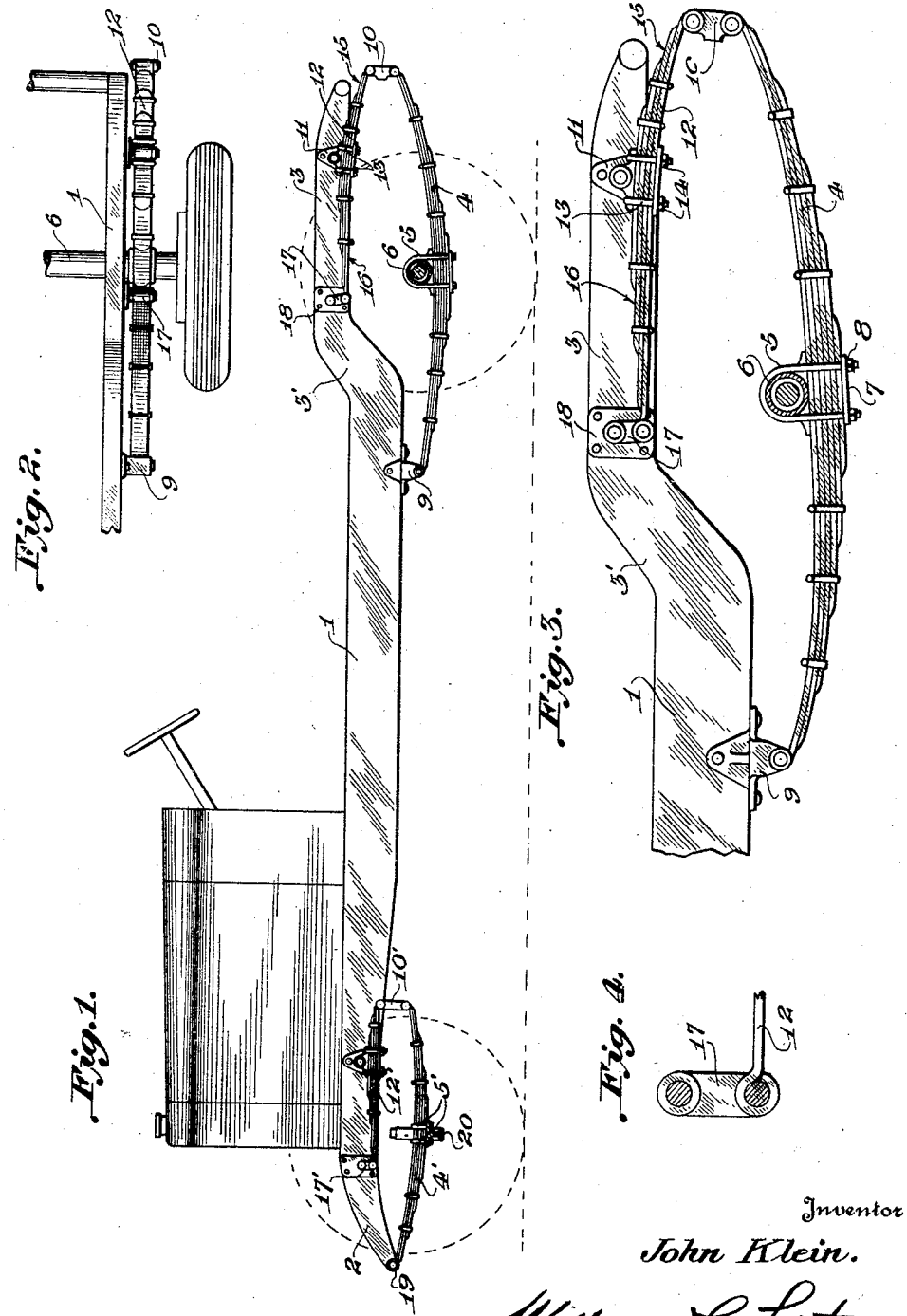
Inventor
John Klein.
By William C. Linton.
Attorney Patented Sept. 7, 1926.

1,599,177

UNITED STATES PATENT OFFICE.

JOHN KLEIN, OF WASHINGTON, DISTRICT OF COLUMBIA, ASSIGNOR OF ONE-HALF TO B. AGEE BOWLES, OF WASHINGTON, DISTRICT OF COLUMBIA.

SPRING SUSPENSION.

Application filed May 12, 1926. Serial No. 108,611.

This invention relates to improvements in vehicle spring suspension devices, having for an object to provide a spring construction whereby with the application of jolts, shocks and similar stresses thereto, the same will be transmitted from the principal supporting spring to a secondary or absorbing spring means, the construction and arrangement of this latter means being such that a portion thereof will be effective for absorbing the lighter or lesser stresses prior to their transmission to the vehicle chassis or body, whereas another portion of the same will function with the first mentioned portion to fully absorb the heavy or major stresses prior to their transmission to the vehicle chassis or body.

It may be stated to be a more specific object of the invention to provide the spring suspension with a novel form and arrangement of shock absorbing spring, the mounting of which is such as to divide it into several separate and distinct shock absorbing areas, said spring being mounted upon the vehicle chassis and having one leg portion connected to the principal supporting spring whereby that portion or area of the same between its chassis mounting and the said connection will function to receive and absorb minor stresses, whereas the opposite leg portion is connected to the vehicle chassis in spaced relation to its mounting thereupon in order that the particular area represented thereby will serve to absorb, in conjunction with the first leg portion or area, major stresses.

Other objects of the invention will be in part obvious and in part pointed out hereinafter.

In order that the invention and its mode of operation may be readily understood by others skilled in the art, I have in the accompanying drawings and in the detailed following description based thereupon, set out one possible embodiment of the invention.

In these drawings:

Figure 1 is a side elevation of the chassis of a motor driven vehicle equipped with the invention, said chassis being modified in its construction to permit of proper installation of the spring suspension device thereupon.

Figure 2 is a fragmentary detail in plan showing the relative mounting and arrangement of the spring suspension device with respect to the chassis, Figure 3 is an enlarged fragmentary detail in side elevation, a portion thereof being in section, as well, showing the specific construction and mounting or arrangement of the spring suspension device and Figure 4 is the fragmentary detail, partly in section, showing the manner in which one end of the shock absorbing spring is connected to the adjacent portion of the vehicle chassis.

Having more particular reference to the drawings in connection with which like characters of reference will designate corresponding parts throughout, the improved spring suspension is adapted to be used upon both the forward and rearward ends of a vehicle chassis, such as I have herein illustrated and generally indicated by the numeral 1, it being understood in this connection, that the construction of the spring suspension devices adjacent the several ends of the vehicle chassis correspond with each other and that a pair of these suspension devices is arranged adjacent each of said ends of the chassis. Therefore, in the description hereinafter set forth, reference will be had to but one of the spring suspension devices, it being understood that such description will suffice for all.

The forward portion or extremities of the opposite sides of the chassis 1 are provided with the usual longitudinally disposed and downwardly extended horns 2, while the rearward extremities or ends of the side portions of said chassis are upwardly disposed as designated by the numeral 3, that is, the portions 3 are upwardly offset with respect to the major portion of the chassis 1 through the medium of the diagonal extensions 3'.

The improved spring suspension device may be stated to comprise a longitudinally disposed upwardly extending semi-elliptical leaf spring generally designated by the numeral 4, said spring being arranged in substantial parallelism to the adjacent side portion of the chassis 1 receiving it, as is shown in the Figure 2; a spring clip or substantially U-shaped securing bolt 5 being passed through the intermediate portion of said semi-elliptical spring 4 as is shown in the Figure 3, whereas the upper portion of said bolt embracingly engages about an adjacent portion of the driving axle casing 6 of the equipped vehicle, the opposite or free extremities of said bolt 5 receiving a clamping plate 7 thereover onto which locking nuts 8 turned into engagement with the screw threaded extremities of the several shanks of said bolt 5 are turned. Thus, a positive connection is effected as between the axle and the semi-elliptical spring 4.

The forwardly disposed end of the spring 4 is pivotally connected through a bracket plate 9 through an adjacent portion of the under side of the corresponding side portion of the chassis 1 while the rearward end thereof is pivotally connected to one end of a shackle 10.

Pivotally mounted upon the corresponding portion 3 of one side of the vehicle chassis 1 through the medium of a pivot plate or bearing 11 is a shorter and downwardly disposed semi-elliptical leaf spring 12; is being noted in this connection that that portion of the plate 11 connected to the said spring 12 has its engagement effected through the medium of inverted U-shaped securing bolts 13 passed about the adjacent portions of such spring 12 whereupon a clamping plate is engaged therewith and is positively secured in position through the medium of locking nuts 14 engaged with the free extremities of said bolts 13. It is also to be noted in this connection that the arrangement of the bolts 13 with respect to the downwardly disposed leaf spring 12 is slightly off center, so that said spring is provided with opposed leg portions of different lengths, that leg portion designated by the numeral 15 being the shorter of the two and being arranged upon the rearward side of said spring 12 and having a suitable bearing formed in its free extremity and pivotally connected to the opposite side of the shackle connection 10, aforesaid. The remaining leg portion 16 of the spring 12 is of greater length than the leg portion 15 and has a bearing formed in its free extremity whereby to effect pivotal connection with a link or shackle 17 which in turn is pivotally connected to a suitable bracket plate 18 fixedly secured to an adjacent portion of the offset part 3 of the vehicle chassis side. It is to be furthermore noted that the length of the spring 12 is such that the forward or free end of the leg portion 16 thereof will be extended for a distance slightly beyond or forwardly of the point of connection of the bolts 5 with the axle casing 6, the purpose of which will be subsequently described.

At this point, it may be also noted that the arrangement or mounting of the spring suspension devices at the forward ends of the vehicle chassis 1 slightly differs from that of the rearwardly arranged suspension devices in that the shorter or secondary spring 12 is substantially straight as is shown in the Figure 1 at the numeral 12'; the rearward end of said spring 12' being pivotally connected to one end of a shackle 10' which is of a length slightly greater than the shackle 10, whereas the forward end of said spring is pivotally connected through a link or shackle 17' to an adjacent portion of the corresponding side of the vehicle chassis 1, preferably in proximity to the horn portion 2 thereof. Also, it will be noted that the forward end of the principal supporting spring 4' is pivotally connected to the free extremity of the adjacent horn 2 as is designated by the numeral 19 whereas the rearward end of said spring is pivotally connected to the adjacent end of the shackle 10', and the intermediate portion of such principal supporting spring is connected through U-shaped securing bolts 5' to an adjacent portion of the forward axle or bolster 20 of the vehicle.

Because of the fact that the forwardly disposed pair of spring suspension devices are not subjected to as great stresses as are the rearwardly disposed pair of said spring devices, I may and preferably do construct or form the forward suspension devices in smaller sizes, as shown in the Figure 1.

In operation or usage of the improved spring suspension devices, it will be understood that ordinary stresses imparted to the principal supporting springs 4 or 4' are partially absorbed thereby whereas the tailings of such stresses will be transmitted to the rearward leg portions 15 of the springs 12 and 12', such leg portions serving to absorb these minor stresses prior to their transmission to the vehicle chassis 1. When, however, the principal supporting springs 4 and 4' are subjected to major or abnormal stresses, the forward leg portions 16 of the springs 12 and 12' will combine with the rearward leg portions thereof in effectually absorbing such abnormal or major stresses prior to their transmission or delivery to the vehicle chassis 1; it being understood that with the application of minor or lesser stresses to the leg portions 15 of said springs 12 and 12', the forward leg portions of said spring will not be flexed inasmuch as the line of resistance to such minor or lesser stresses will be from the points of pivotal connection of the free extremities of said leg portions 15 to the pivotal mountings of the springs 12 and 12' upon the adjacent portion of the vehicle chassis 1 through the medium of the pivotal bracket plates 11 hereinbefore described. As stated heretofore, however, with the application of major or abnormal stresses to said absorbing springs 12 and 12', the forward leg portions 16 of such springs will be flexed to such an extent as to fully absorb the same prior to their delivery or transmission to the vehicle chassis 1. Also, by reason of the fact that the forward leg portions 16 of the shock absorbing springs 12 and 12' are of greater lengths, it will be understood that the shock absorbing properties of such forward portions are materially greater than those of the rearward leg portions 15, and by consequence, that these said forward leg portions 16 will serve to effectually absorb the abnormal or major stresses, preventing material delivery of the tailings thereof to the chassis 1.

Furthermore, by extending the forward ends of the shock absorbing springs 12 and 12' to points beyond and forwardly of the points of connection of the principal supporting springs 4 and 4' to their respective supporting devices, I find that a greater cantilever action results, hence, materially aiding the shock absorbing qualities or properties of the spring suspension devices.

Manifestly, the construction shown is capable of considerable modification and such modification as is within the scope of my claims, I consider within the spirit of my invention.

I claim:

1. A spring suspension device for vehicles comprising in combination with the vehicle chassis, a longitudinally disposed upwardly extending semi-elliptical spring means having the intermediate portion thereof fixedly connected to a portion of the vehicle, a shock absorbing leaf spring arranged above said longitudinally disposed spring and in parallelism thereto, one end of said shock absorbing spring being pivotally connected to the adjacent end of said first spring and the opposite end of said shock absorbing spring being pivotally connected to an adjacent portion of the vehicle chassis, the remaining extremity of said first mentioned spring being pivotally connected to a portion of the vehicle chassis spaced from the pivotal connection of the shock absorbing spring thereto, means for pivotally connecting the intermediate portion of said shock absorbing spring to a portion of the vehicle chassis, and the said last mentioned connecting means being arranged with respect to said shock absorbing spring whereby to provide the same with opposed leg portions of unequal lengths.

2. A spring suspension device for vehicles, comprising in combination with a vehicle chassis, a principal supporting semi-elliptical leaf spring fixedly connected at its intermediate portion to a portion of the vehicle, the forward end of said principal spring having pivotal connection with a portion of the vehicle chassis, a shock absorbing spring arranged above said principal supporting spring and being of less length than said principal supporting spring and arranged in parallelism thereto, the rearward extremity of said shock absorbing spring having pivotal connection with the adjacent rearward extremity of said principal supporting spring and the forward end of the shock absorbing spring having pivotal connection with a portion of the vehicle chassis, means for pivotally connecting the intermediate portion of said shock absorbing spring to a portion of the vehicle chassis, and said last mentioned connecting means being arranged upon said shock absorbing spring whereby to provide the same with opposed leg portions of unequal length.

3. A spring suspension for vehicles comprising in combination with a vehicle chassis, an upwardly disposed longitudinally extending semi-elliptical principal supporting leaf spring, the intermediate portion of said leaf spring having connection with a portion of the vehicle and the forward end of said principal supporting spring having pivotal connection with a portion of the vehicle chassis, a shock absorbing spring of less length than the principal supporting spring positioned above the same and arranged in parallelism thereto, the rearward end of said shock absorbing spring being pivotally connected to the adjacent rearward end of said principal supporting spring, the forward end of said shock absorbing spring being pivotally connected to an adjacent portion of said vehicle chassis at a point beyond and forwardly of the intermediate connection of said principal supporting spring to the vehicle, and means for pivotally connecting the intermediate portion of said shock absorbing spring to a portion of the vehicle chassis, said means being arranged upon the shock absorbing spring whereby to divide the same into opposed leg portions of different lengths.

In witness whereof I have hereunto set my hand.

JOHN KLEIN.